(No Model.)
J. H. MINER.
SAW MILL DOG.
No. 416,937. Patented Dec. 10, 1889.
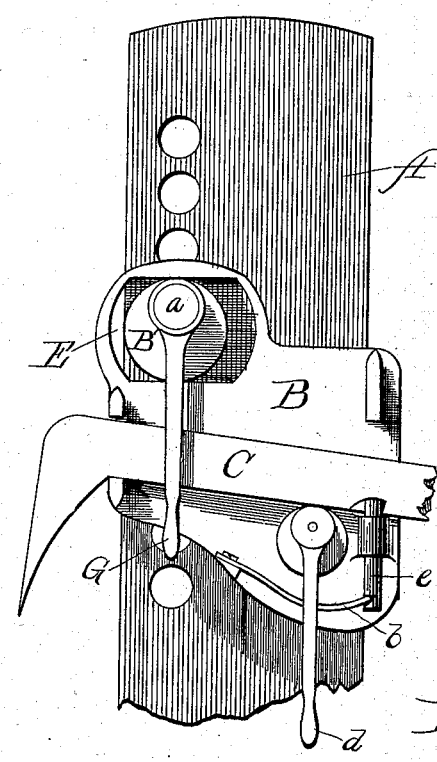
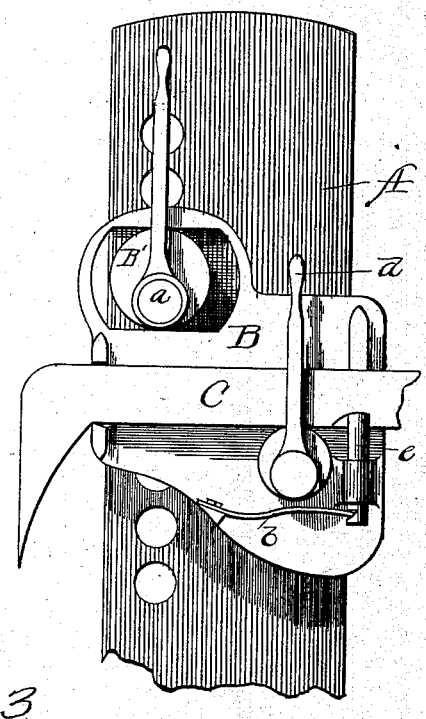
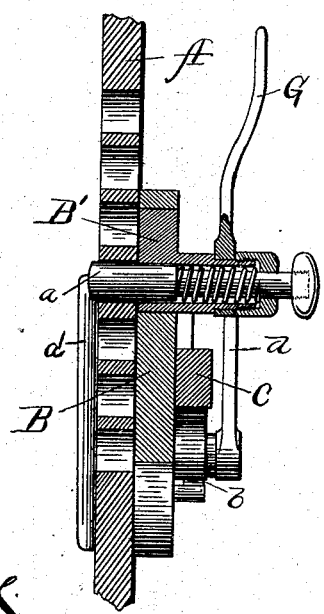
Witnesses.
Walter P. Keene.
W. A. Donaldson.
Inventor:
James H. Miner.
By Ellis Spear
Atty.

UNITED STATES PATENT OFFICE.

JAMES HENRY MINER, OF BATON ROUGE, LOUISIANA.

SAW-MILL DOG.

SPECIFICATION forming part of Letters Patent No. 416,937, dated December 10, 1889.

Application filed January 15, 1889. Serial No. 296,379. (No model.)

*To all whom it may concern:*

Be it known that I, JAMES HENRY MINER, of Baton Rouge, in the parish of East Baton Rouge and State of Louisiana, have invented a new and useful Improvement in Saw-Mill Dogs; and I do hereby declare that the following is a full, clear, and exact description of the same.

My invention is an improvement in saw-mill dogs, and relates particularly to that class represented in Letters Patent granted to me on the 10th day of April, 1888, No. 380,916.

The present invention refers particularly to the means for raising and lowering the frame which supports the dog.

In the accompanying drawings, Figure 1 represents a front elevation of the dog as supported upon a standard. Fig. 2 is a like view showing the frame supporting the dog as being raised into a higher position than that shown in Fig. 1. Fig. 3 represents a vertical section of the standard and the frame and dog supported thereon.

In the drawings the standard is represented at A, and supported upon the standard is a frame B, the edges of which preferably pass around the edges of the standard, as in my patent referred to and as shown at $a'$, Fig. 3; and it is supported in any desired position by means of a pin $a$, which passes through any one of a series of holes in the standard. The dog (represented at C) is of substantially the form shown in my said patent, and is held in the frame in suitable guides, which are deeper in rear than in front, so that by adjusting the rear of the dog the front end is thrown in or out. In the present case, as in my patent aforesaid, I use an eccentric with a lever attached, by means of which I lift the outer end of the dog to the extent desired; but instead, as in my patent referred to, of providing a spring-pin in engagement with the upper side of the dog to keep it normally pressed downwardly, I place this spring-pin in connection with the under side of the end of the dog, as shown at $e$, the spring being shown at $b$. As the lever $d$ of the eccentric is thrown to tilt the dog the spring $b$ lifts the pin $e$ and tends to keep it in engagement with the notched bar. When it is desired to set the dog for larger timber, the outer end of the dog is simply lifted over the spring-pin to another notch.

In order to allow of the limited adjustment of the frame vertically on the standard, I provide a loop on the upper part of the frame, as shown at E, and within this loop is an eccentric B', which is secured to or forms a part of a sleeve $c$. This sleeve extends at right angles to the eccentric and has a central opening, through which the pin $a$ passes, which supports the whole frame. A handle G is slipped over the end of the sleeve, and a screw-cap fits the threaded outer end of the sleeve and clamps the handle in place. The head of the pin is also secured in place by screw-threads, so that it may be removed to allow the handle G and the screw to be slipped over it into place. As the sleeve, and consequently its supporting-pin, is placed to one side of the center of the eccentric B', it will be seen that by turning the handle G, when the parts are in position shown in Fig. 1, the high part of the eccentric will be turned from its lowest position to its highest, and thus will have the effect of moving the frame upward. Around the pin I place a coiled spring between it and the sleeve, with one end bearing on a shoulder on the pin and the other end bearing against the screw-cap, and this has the tendency to put a tension on the pin and to keep it in engagement with the standard.

I claim as my invention—

1. In combination with the standard, the frame carrying the dog, an adjustable supporting-pin for said frame, and an eccentric and lever supported on said pin for giving limited vertical movement to the frame, substantially as described.

2. In combination, the standard, the dog, the supporting-frame therefor, the supporting-pin for the frame, an eccentric held on said pin and in connection with the frame, and a handle for operating the eccentric to adjust the frame, substantially as described.

3. In combination, the standard, the frame, the dog, the pin supporting the frame, a loop on the upper part of the frame, an eccentric within the loop supported on the pin, and a handle for the eccentric, substantially as described.

In testimony whereof I have signed my name to this specification in the presence of two subscribing witnesses.

JAMES HENRY MINER.

Witnesses:
J. A. MILLER,
F. H. WOODS.